UNITED STATES PATENT OFFICE.

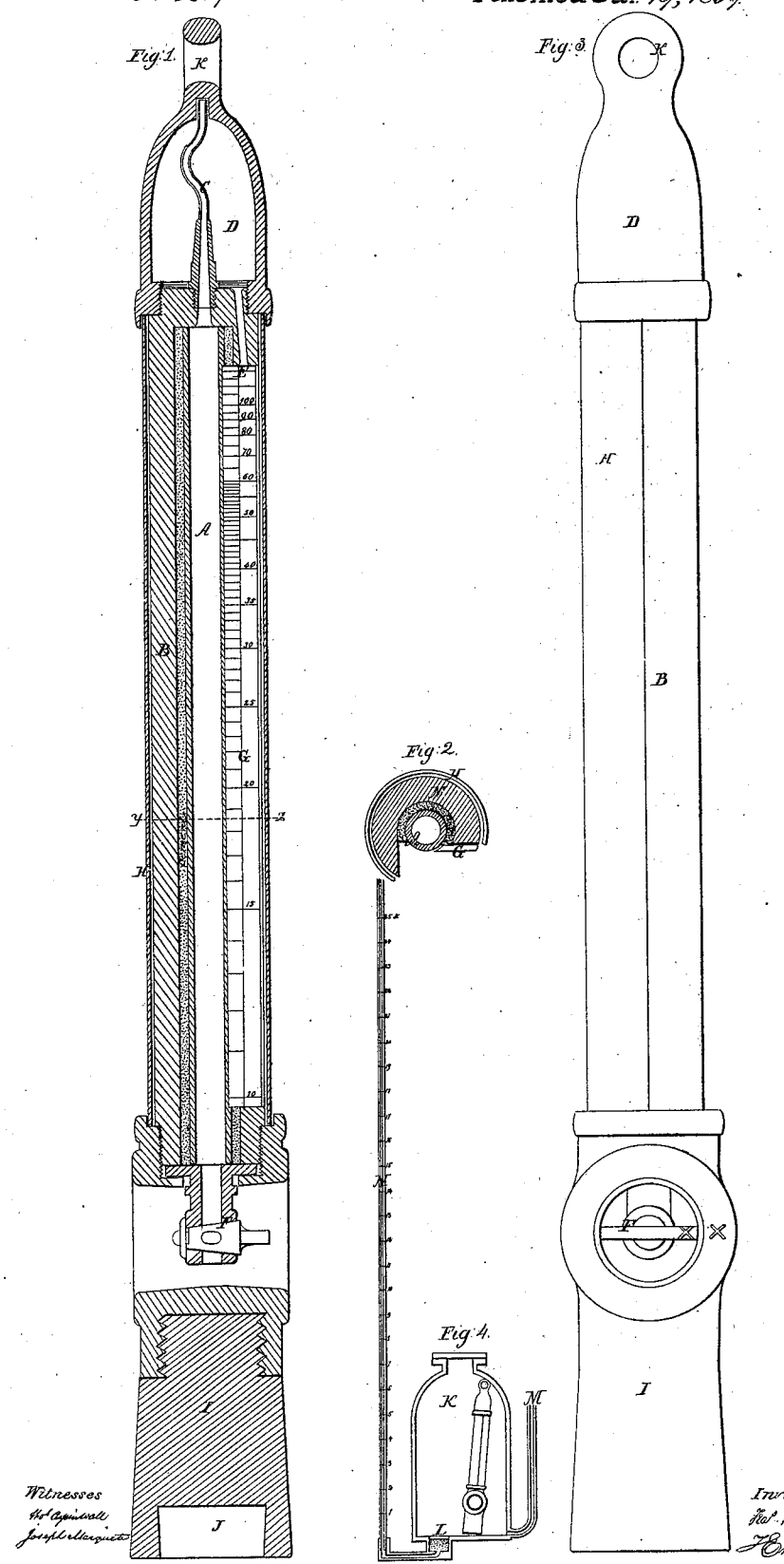

FRANCIS B. OGDEN, OF NEW JERSEY, AND JOHN ERICSSON, OF LONDON, ENGLAND.

SOUNDING INSTRUMENT FOR ASCERTAINING THE DEPTH OF WATER IN SEAS, RIVERS, &c.

Specification of Letters Patent No. 287, dated July 19, 1837.

*To all whom it may concern:*

Be it known that we, FRANCIS B. OGDEN, of the State of New Jersey, and a citizen of the United States, and JOHN ERICSSON, a subject of the Kingdom of Sweden, residing in London, England, have conjointly invented a new and useful instrument for the purpose of ascertaining with accuracy the depth of water or soundings from a ship or vessel when by reason of currents the rapidity of the vessel's way through the water or other causes it can not be determined in the usual manner by the lead-line; and that the following is a full and exact description of the construction and operation of the said instrument as invented by us.

This invention which we name as above consists in ascertaining the depth by means of the pressure of the water which at given depths is always nearly alike, the water being allowed to enter the instrument and made to compress a certain quantity of atmospheric air contained therein, and to overflow the orifice of a small tube into a glass tube or recipient in which it will rise in proportion to the superincumbent pressure, and thereby indicate the depth to which the instrument may be lowered.

Figure 1 representing a longitudinal section; Fig. 2, a transverse section; and Fig. 3 a side view of the said instrument.

A, is a glass tube or recipient open at both ends, firmly bedded in a cast iron stem, B, by means of plaster of Paris, or other cement; C, is a small tortuous pipe inserted into the top of the glass tube, and in continuation with it. This pipe is open at the top, and communicates therefore freely with the air-chamber, D; and this last with the external air by the small tube whose orifice is E.

F is a common stop-cock at the bottom of the glass tube.

G is a brass plate graduated into divisions each of which indicates one fathom.

H is a slide or guard for protecting the glass tube.

I is a conical piece of lead screwed into the bottom of the instrument for increasing its weight, this piece of lead has a cavity, J, for receiving the arming in the usual manner.

K is a loop or eye at the top of the instrument for attaching the line.

When the instrument is to be used, the stop-cock F, should be closed by setting it at X, the guard is partly closed so as to protect the glass tube, and the instrument is thrown overboard with the line attached. The pressure of the water at E begins at once to exceed the pressure of the air within the chamber D, and tube A, and the water begins to rise through the small tube E into the air chamber, driving the air before it into the upper portion of the chamber D and tube A until it has risen to the top of the tortuous pipe C. At this instant the whole of the air before contained in the chamber and tube is confined in the tube only; the water therefore still entering at E, falls over the orifice of C into the glass tube or recipient A, and rises in it, until the elastic force of the air contained therein becomes equal to the pressure of the superincumbent water when the overflowing ceases, the division to which it rises always indicating the depth to which the instrument has descended. As the instrument is hauled up again the air expanding in the tube A forces the water gradually out of the chamber D. When the instrument is taken on board it should be held upright; the height of the water in the glass tube will indicate the depth in fathoms, according to the divisions on the brass plate G. The water being let out by turning the cock F, it should be set again at X, and the instrument is ready for use.

Having thus described the nature of our instrument, and the manner of using the same, we will now proceed to describe the manner in which we obtain the divisions on the brass plate, G, which is as follows: The instrument is put into a strong vessel K shown in Fig. 4 made of cast iron and filled with water having a lid at the top to be firmly secured after the insertion of the instrument. A cavity, L, is made at the bottom of the vessel K, containing mercury which communicates with a glass tube N, placed perpendicularly, and divided into divisions of 5 42/100 of an inch each. An ordinary force-pump is also to be attached to the vessel K, and by means of the pipe M, water is to be forced into the said vessel until the mercury rises in the glass tube N, to any given division, which division being noted the instrument is taken out and the height of the water in the glass tube marked on the brass plate. The pressure of a column of mercury of 5 42/100 of an inch being equal to the pressure of a column of salt water of one fathom,—it follows that by subjecting the instrument in succession to a pressure which will raise the mercury to each division on the glass tube N, and thus marking the height of the water in the glass tube of the instrument, the brass plate will be correctly graduated into divisions indicating fathoms.

Whereas we claim as our invention—

An instrument for ascertaining the depth of water in seas and rivers in which the water is allowed to enter in the manner above specified thereby compressing a quantity of atmospheric air, and overflowing into a glass tube or recipient in which the height of the water so overflowed is made to indicate the depth to which the instrument has been lowered.

FRAS. B. OGDEN.
J. ERICSSON.

Witnesses:
  THOS. ASPINWALL,
  JOSEPH MARQUETE.